United States Patent
Jukarainen et al.

(10) Patent No.: US 6,300,452 B1
(45) Date of Patent: Oct. 9, 2001

(54) BLOCK COPOLYMERS AND PREPARATION THEREOF

(75) Inventors: Harri Jukarainen, Turku; Jarkko Ruohonen, Vanhalinna; Matti Lehtinen, Piispanristi; Juha Ala-Sorvari, Turku; Jukka Seppälä, Helsinki, all of (FI)

(73) Assignee: Leiras Oy, Turku (FI)

( * ) Notice: Subject to any disclaimer, the term of this patent is extended or adjusted under 35 U.S.C. 154(b) by 0 days.

(21) Appl. No.: 09/442,403

(22) Filed: Nov. 18, 1999

Related U.S. Application Data

(63) Continuation-in-part of application No. PCT/FI98/00630, filed on Aug. 17, 1998.

(30) Foreign Application Priority Data

Aug. 22, 1997 (FI) .................................................. 973427

(51) Int. Cl.$^7$ .................................................. C08G 77/46
(52) U.S. Cl. .................. 528/15; 528/31; 528/25; 528/26; 556/445
(58) Field of Search .................. 556/445; 528/31, 528/15, 26, 25

(56) References Cited

U.S. PATENT DOCUMENTS 3,836,560 * 9/1974 Prokai et al. .................. 260/448.8 R
6,187,891 * 2/2001 Rautschek et al. .................. 528/25

* cited by examiner

*Primary Examiner*—Margaret G. Moore
(74) *Attorney, Agent, or Firm*—James C. Lydon

(57) ABSTRACT

The invention relates to a new polysiloxane-based block copolymer having a formula $$T(AB)_xAT \qquad (I)$$

wherein

A=—(SiR'R"O)$_n$SiR'R"—, wherein R' and R" are the the same or different and represent a lower alkyl group or a phenyl group, wherein said alkyl or phenyl group may be substituted or unsubstituted;

B is polyalkylene oxide of formula

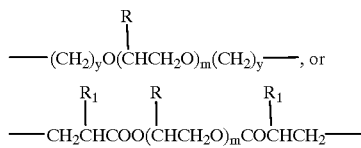

and T is

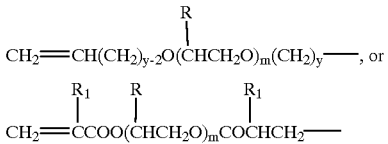

wherein

R is hydrogen, lower alkyl, or phenyl; R$_1$ is hydrogen or lower alkyl; y is 2–6; m is 1–30; n is 1–3000; and x is 0–100.

8 Claims, No Drawings

BLOCK COPOLYMERS AND PREPARATION THEREOF

This application is a continuation-in-part of International Application No. PCT/FI98/00630, filed Aug. 17, 1998 and published on Mar. 4, 1999 in the English language.

The invention relates to new polysiloxane based block copolymers and to the preparation thereof.

Silicones, or polyorganosiloxanes, represent a broad spectrum of synthetic silicon based polymers of formula $(R'R''SiO)_n$, where R' and R'' represent alkyl groups, usually methyl, ethyl, propyl, or phenyl groups. In the literature, various methods for the preparation of siloxanes are known, for example, Walter Noll, Chemistry and Technology of Silicones, Academic Press, Orlando, 1968, 190–245, and John C Saam, in John M Zeigler and F W Gordon Fearon, ed., Silicon-Based Polymer Science, A Comprehensive Resource, Advances in Chemistry Series, American Chemical Society, Washington, D.C., 1990, 71–90.

Polysiloxanes, particularly poly(dimethyl siloxanes), are used extensively as such in technical applications.

Copolymers of polysiloxane and poly(alkylene oxide) are known. Known copolymers of this type are useful as emulsifiers and stabilizers. The preparation of such copolymers by hydrosilylation has been reported in the literature (Polysiloxane Copolymers/Anionic Polymerization, Springer-Verlag Berlin Heidelberg 1988, pp. 46–47; H W Haesslin & H F Eicke, Makromol Chem 185, 2625–2645, (1984); H W Haesslin, Makromol Chem 186, 357–366 (1985), and M Galin & A Mathis, Macromolecules 1981, 14, 677–683. The preparation of block copolymers AB, ABA and (AB)n, where A represents poly(ethylene oxide) (PEO) and B is poly(dimethyl siloxane), by hydrosilylation of mono- or diallyl-terminated PEO-oligomers and Si-H-terminated PDMS oligomers with hexachloroplatinic acid as a catalyst, was reported by Haesslin. The molecular weight of PDMS-oligomer was 1000 g/mol and the molecular weight of ternary block copolymers (ABA) was between 1550 g/mol and 1800 g/mol.

Haesslin & Eike describe ternary block copolymers PEO-PDMS-PEO, where the molecular weight of PDMS is 1000 g/mol and the molecular weight of PEO-block is between 100 g/mol and 750 g/mol.

Galin & Mathis describe the preparation of ternary PDMS-PEO-PDMS block copolymers. The molecular weight of PDMS was between 1000 g/mol and 4700 g/mol and the molecular weight of PEO was between 6200 g/mol and 10,700 g/mol.

European Patent Publication EP 545,002 describes grafted polysiloxanes prepared by hydrosilylation of polysiloxanes with polyalkylene oxides of formula $CH_2=CHCH_2O(CHRCH_2O)_mCH_2CH=CH_2$. In these polymers, the polyether moieties are linked to the alkyl substituent of silicon instead of being linked to the stem.

OBJECT OF THE INVENTION

This invention is directed to providing new alkylene terminated polysiloxane-poly(alkylene oxide)-based block copolymers of controlled polarity for the preparation of elastomers, either as such or as a component in the elastomeric structure or as a component in the mixture of an elastomeric composition. The new copolymers must satisfy the following criteria:

1. In the preparation of elastomers, the copolymer should be capable of crosslinking, for example by hydrosilylation. Thus the copolymer should include an alkenyl-terminated polyalkylene oxide block at both of its ends to allow crosslinking by hydrosilylation. The copolymers described in Galin & Mathis do not satisfy this condition.

2. The ternary block copolymers described in Haesslin and Haesslin & Eicke are rather small. The polymers described in these publications do not either end up in alkylene terminated polyalkylene oxide blocks. Moreover, it is of importance for the present invention that polysiloxane and polyalkylene oxide blocks are linked to each other by silicon-carbon bonds.

3. The copolymer can exist in one phase. If the molecular weight of the polyalkylene block is too high in relation to the molecular weight of the polysiloxane unit, phase separation will occur.

SUMMARY OF THE INVENTION

Thus, the invention is directed to a new polysiloxane-based block copolymer of formula $$T(AB)_x(AT) \tag{I}$$

wherein

A=—$(SiR'R''O)_n SiR'R''$—, wherein R' and R'' are the same or different and represent a lower alkyl group or a phenyl group, where said alkyl or phenyl group may be substituted or unsubstituted;

B is polyalkylene oxide of formula

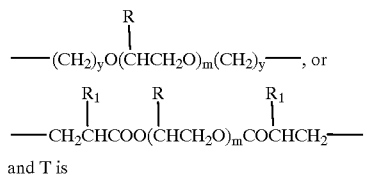

and T is

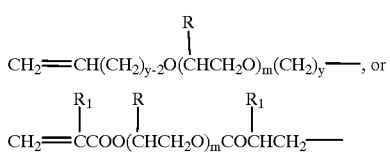

wherein

R is hydrogen, lower alkyl, or phenyl, $R_1$ is hydrogen or lower alkyl, y is 2–6, m is 1–30, n is 1–3000, and x is 0–100.

The term "lower alkyl" represents $C_1$–$C_6$ alkyl groups.

The substituents R' and R'' of formula (I) are preferably both methyl groups.

The number y is preferably 2.

R is preferably hydrogen, methyl, or phenyl.

According to a preferred embodiment, the B in the formula (I) is

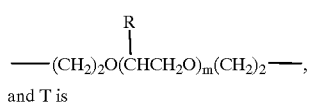

and T is

-continued

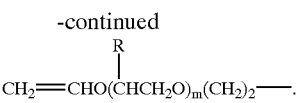

The invention is also directed to a method for the preparation of new compounds of formula (I). The method is characterized in that the polysiloxane of formula (II)

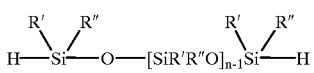

wherein R' and R" are the same, or different, lower alkyl or phenyl groups, where said alkyl or phenyl group may be substituted or unsubstituted, is reacted, in the presence of a catalyst, with a polyalkylene oxide of formula (IIIa) or (IIIb)

where R, $R_1$, n, and m are the same as above.

Preferred compounds of the group IIIa include vinyl or allyl terminated polyethylene glycol. A preferred compound of the group IIIb is, for example, methacryl terminated polyethylene glycol.

A preferred catalyst is a noble metal catalyst, most generally a platinum complex in alcohol, xylene, divinyl siloxane, or cyclic divinyl siloxane. An especially preferred catalyst is Pt(0)divinyl tetramethyl siloxane complex.

In order to prepare the α,ω-alkylene terminated PEO (PDMS-PEO)$_n$ copolymer, the compound of formula (IIIa) or (IIIb) must be used in excess in relation to the compound of formula (II). Preferably, the molar ratio $$\frac{\text{compound of formula (IIIa) or (IIIb)}}{\text{compound of formula (II)}}$$

is between 1.05 and 2.0.

The invention is disclosed below in greater detail with reference to the examples.

EXAMPLE 1

Procedure for an α,ω-vinyl terminated PEO-(PDMS-PDO)$_n$ polymer, where the hydride terminated PDMS has a molecular weight of 5000 g/mol and the vinyl terminated PEO has a molecular weight of 240 g/mol.

0.528 g of anhydrous vinyl-terminated polyethylene glycol (PEOVI, α,ω-vinyl-terminated) with a molecular weight of 240 g/mol is weighed to a dried three-necked flask with a capacity of 50–100 ml. In addition, to the same vessel is added 10 g of polydimethyl siloxane (PDMS, α,ω-hydride-terminated, $M_n$=5000 g/mol). The content of hydride groups in PDMS is 0.04% by weight resulting in 4 mmol of hydride groups per 10 grams with the amount of previously weighed PEOVI-vinyl groups being 4.4 mmol (=2×0.528/240 mol). The excess of the vinyl groups in the reaction results in vinyl groups in both ends of the final product, which is a prerequisite for the subsequent crosslinking. In addition, toluene, dried by distillation, is added to the reaction such that its content is 30% (4.5 g) by weight, in order to facilitate mixing and to keep the reaction from occurring too vigorously. The reaction solution is stirred over a magnetic stirring plate at 400 rpm and dry oxygen is bubbled through the solution (about three bubbles per second), which prevents the conversion of the catalyst to a metallic state, thus preventing the deactivation of the catalyst. After addition of the catalyst (Pt(0)divinyl tetramethyl siloxane complex) through the septum, the reaction solution is warmed to 50° C. The amount of the catalyst is 50 ppm based on the total amount of reactants participating in the reaction. The catalyst is added dropwise thus preventing the formation of hot spots in the reactor. Upon addition of the catalyst the polymerization is allowed to proceed for 2 hours. The completion of the reaction is then confirmed by IR (the loss of Si—H-peak at 2130 cm$^{-1}$). Upon the cessation of the polymerization the reaction is warmed to 65° C. and toluene removed under vacuum (4 mm Hg) for 30 minutes. The absence of toluene is detected most preferably by using NMR.

EXAMPLE 2

Procedure for α,ω-allyl-terminated PEO-(PDMS-PEO)$_n$ polymer where PDMS has a molecular weight of 5000 g/mol and the allyl terminated PEO has a molecular weight of 520 g/mol.

To a dried three-necked flask with a capacity of 50–100 ml is weighed anhydrous allyl-terminated polyethylene glycol (PEOA, α,ω-allyl-terminated) having a molecular weight of 520 g/mol, and hydride-terminated polydimethyl siloxane (PDMS, α,ω-hydride terminated $M_n$=5000 g/mol). The mass of PEOA is 1.38 g (5.28 mmol of allyl groups) and the mass of PDMS is 12 g (4.8 mmol of hydride groups), and thus the amount of allyl groups exceeds the amount of the hydride groups by 10 per cent. This secures an allyl terminated end product. In addition, toluene is weighed to the reaction vessel such that it represents 45% (7.2 g) by weight. The reaction mixture is stirred on a magnetic stirring plate at 400 rpm and dry oxygen is bubbled through the mixture (about three bubbles per second). The reaction mixture is brought to a temperature of 60° C. The catalyst (Pt(0)divinyl tetramethyl siloxane complex) is then cautiously added to the mixture through the septum one drop at a time. The amount of the catalyst is 50 ppm based on the added reactants. The polymerization is allowed to proceed for 6 hours and the completion of the polymerization is then confirmed by IR (the loss of the Si—H-peak at 2130 cm$^{-1}$). For the removal of toluene the reaction is brought to 65° C. and toluene removed under vacuum (4 mm Hg) for 30 minutes. The absence of toluene is detected by NMR.

EXAMPLE 3

Procedure for monophasic α,ω-methacryl terminated PEO(PDMS-PEO)$_n$ polymer, where the hydride-terminated PDMS has a molecular weight of 5000 g/mol and the methacrylated PEO has a molecular weight of 538 g/mol.

To a dried three-necked flask with a capacity of 50–100 ml is weighed anhydrous methacryl-terminated polyethylene glycol (PEOMA, α,ω-methacryl-terminated) with a molecular weight of 538 g/mol, and hydride-terminated polydimethyl siloxane (PDMS, α,ω-hydride terminated $M_n$=5000 g/mol). The mass of PEOMA is 1.184 g (4.4 mmol of methacryl groups) and the mass of PDMS is 10 g (4.0 mmol of hydride groups), and thus the amount of methacryl groups exceeds the amount of the hydride groups by 10 per cent. This secures a methacryl terminated end product. In addition, toluene is weighed to the reaction vessel such that it represents 45% (9.2 g) by weight. The reaction mixture is stirred on a magnetic stirring plate at 400 rpm and dry oxygen is bubbled through the mixture (about three bubbles per second). The reaction mixture is brought to a temperature of 60° C. The catalyst (Pt(0)divinyltetramethyl siloxane complex) is then added to the mixture through the septum one drop at a time. The amount of the catalyst is 50 ppm based on the added reactants. The polymerization is allowed to proceed for 20 hr and the completion of the polymerization is then confirmed by IR (the loss of the Si—H-peak at 2130 cm$^{-1}$). For the removal of toluene the reaction is brought to 65° C. and toluene removed under vacuum (4 mm Hg) for 30 minutes. The absence of toluene is detected by using NMR.

For an expert in the art it is clear that the different embodiments of the invention may vary within the scope of the claims presented below.

What is claimed is:

1. A new polysiloxane-based block copolymer characterized by the formula

T(AB)$_x$AT  (I)

wherein

A=—(SiR'R"O)$_n$SiR'R"—, wherein R' and R" are the same or different and represent a lower alkyl group or a phenyl group, where said alkyl or phenyl group may be substituted or unsubstituted;

B is polyalkylene oxide of formula

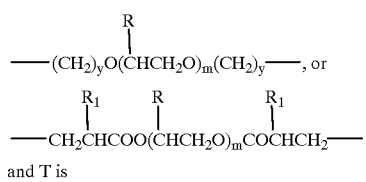

and T is

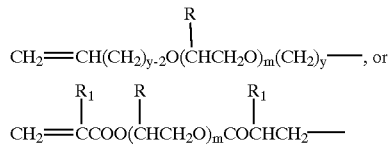

wherein

R is hydrogen, lower alkyl, or phenyl; R$_1$ is hydrogen or lower alkyl; y is 2–6; m is 1–30; n is 1–3000; and x is 0–100.

2. The block copolymer according to claim 1, characterized in that R' and R" in the formula (I) are each methyl groups; y is 2; and R is hydrogen, methyl, or phenyl.

3. The block copolymer according to claim 1, characterized in that B in the formula (I) is

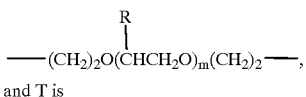

and T is

4. A method for the preparation of a polysiloxane-based block copolymer (I) of claim 1, characterized in that a polysiloxane of formula (II)

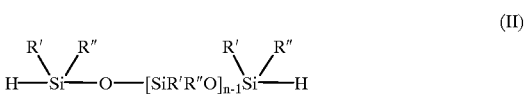

(II)

wherein R' and R" are the same or different and represent a lower alkyl group or a phenyl group, where said alkyl or phenyl group may be substituted or unsubstituted;

is reacted in the presence of a catalyst with a polyalkylene oxide of formula (IIa) or (IIIb)

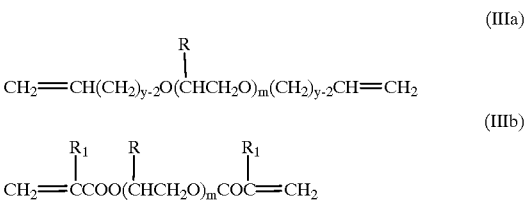

wherein R, R$_1$, n, and m are the same as defined in claim 1.

5. The method according to claim 4, characterized in that the catalyst is a noble metal catalyst.

6. The method according to claim 5, characterized in that the catalyst is a Pt(0)divinyl tetramethyl siloxane complex.

7. The method according to claim 5, wherein said noble metal catalyst comprises a platinum complex in alcohol, xylene, divinyl siloxane or cyclic vinyl siloxane.

8. The block copolymer according to claim 1, wherein m is 1–3.

* * * * *